No. 862,648. PATENTED AUG. 6, 1907.
J. R. MILLER & U. S. HUGGINS.
METHOD OF MANUFACTURING TILES.
APPLICATION FILED MAY 17, 1907.
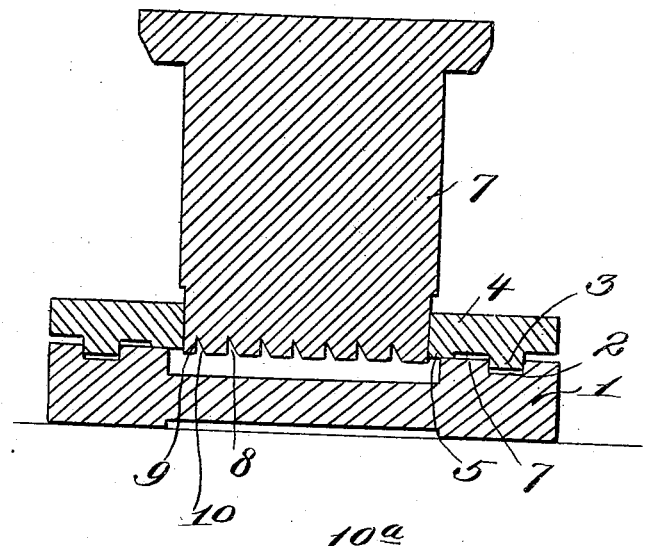
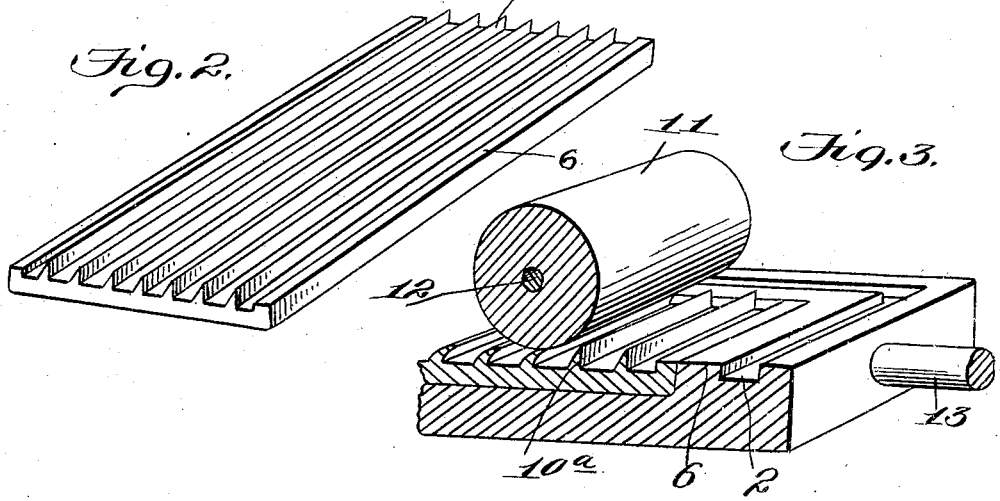

UNITED STATES PATENT OFFICE.

JOSEPH R. MILLER, OF MORGANTOWN, AND ULYSSES S. HUGGINS, OF WESTON, WEST VIRGINIA.

METHOD OF MANUFACTURING TILES.

No. 862,648.  Specification of Letters Patent.  Patented Aug. 6, 1907.

Application filed May 17, 1907. Serial No. 374,121.

*To all whom it may concern:*

Be it known that we, JOSEPH R. MILLER, of Morgantown, county of Monongalia, State of West Virginia, and ULYSSES S. HUGGINS, of Weston, county of Lewis, West Virginia, citizens of the United States, have invented new and useful Improvements in Methods of Manufacturing Tiles, of which the following is a specification.

This invention relates to a method of manufacturing tiles of glass or other suitable plastic material, and which have one face formed with under-cut projections to constitute a clenching means for retaining the tile in position when set; and the object thereof is to provide a method which will vastly facilitate the manufacturing of such form of tile, thereby increasing the output without any deleterious effect to the completed article, and further decreasing the cost of the article.

In describing the method reference will be had to the accompanying drawing, wherein is shown by way of example an apparatus in which the method can be carried out.

In the accompanying drawing—Figure 1 is a vertical sectional view of a mold and plunger; Fig. 2 shows the tile in an incompleted condition; Fig. 3 illustrates an element of the apparatus for completing the tile, and, Fig. 4 is an edge view of the completed article.

A method for manufacturing glass tiles in accordance with this invention embodies three steps, the first of which is the supplying to a mold of any desired shape with the walls thereof of any suitable configuration, the necessary quantity of molten glass or other material from which the tile is formed. The second step consists in the forming in one face of the tile of a series of vertical projections extending longitudinally of one face of the tile and in parallelism with a pair of longitudinally extending raised edges, the vertical projections extending above the plane of the raised edges and having one face thereof straight and the other face beveled; and the third step resides in subjecting the incompleted tile while in a heated condition to suitable means whereby the projections will have their outer ends bent over in a curvilinear manner so as to form the completed article with under-cut projections with the ends thereof extending above the plane of the raised edges and which constitute clenching means for the tile when set, the curvilinear ends of the projections extending in the same direction and by such an arrangement the cement in which the tile is embedded will be allowed to expand and contract without cracking or breaking off the clenching means. This method of forming a glass tile overcomes the objection to the method or machines now in general use in this particular: Glass tiles are formed with under-cut projections and irregular edges. After being formed in such manner the irregular edges are ground off so as to form a smooth surface. This grinding off necessitates time, labor and expense and the primary advantage obtained from the method in accordance with this invention overcomes the grinding step because the tile is molded with smooth or ornamented sides.

The form of apparatus shown by way of example for carrying out a method in accordance with this invention consists of a mold 1, which may be round, square, rectangular, or any other suitable shape, with the walls and bottom thereof smooth or formed in any desirable manner so as to provide the sides, ends and outer face of the tile smooth, ornamented or fluted as is desired. The top of the mold 1 has a groove 2 for receiving the offset 3, which projects from the lower face of the apertured guide plate 4 for the die or plunger 7. The plate 4 is so constructed as to have a portion thereof project over the walls of the receiving portion of the mold, as at 5, so that the inner face of the tile, when completed, will be formed with the smooth, raised longitudinally extending edges 6 arranged in parallelism with respect to the vertically extending ribs 10 (Fig. 2). The opening through the plate 4 is of such diameter as to allow of the operation there-through of the die or plunger 7, the walls of the opening guiding the die or plunger 7, the fit being somewhat snug, but not too tight to retard the movement of the die or plunger. The latter is adapted to be reciprocated through the medium of any suitable means and has a flat working face which is formed with a plurality of elongated notches 8 extending from end to end of the plunger and suitably spaced apart. The notches 8 each have one wall thereof perpendicular, as at 9, and the other wall inclined, as at 10, and, owing to the providing of the working face of the die or plunger 7 with the notches 8, it is evident that when it is forced against the material within the mold 1, the notches 8 will cause one face of the tile to be formed with a plurality of vertically-extending ribs $10^a$ which are of such height as to project above the top edge of the mold body.

The apparatus further comprises a revoluble roller 11, which may be mounted upon a revoluble axis or loosely mounted upon a stationary axis, (as shown a stationary axis 12) and the function of the roller 11 is to contact with the top of the ribs 10 so as to bend them over in a curvilinear manner as at 14 (see Fig. 3), thereby forming under-cut projections which constitute clenching means for the tile, the curvilinear outer ends of the ribs extending in the same direction. After the die or plunger 7 has operated upon the material within the mold to form the vertically-extending ribs 10 the plunger is withdrawn and the mold with the incompleted article in a heated condition, through the medium of the handle 13, is passed under the roller 11 in one direction, which causes the ends of the ribs to be bent over in a curvilinear manner which forms the under-cut projections constituting the clenching means. The tile, after it has been subjected to the roller 11, is completed, the shape of the projections being that as shown in Fig. 4.

What we claim is—

A method of manufacturing tiles comprising the forming of a mass of plastic material in a tile having one face provided with longitudinally extending raised edges and with a series of vertical ribs extending above the plane of the raised edges and in parallelism with respect to such edges, and then bending over the ends of the ribs in one direction and in a curvilinear manner while maintaining the ends of the ribs above the plane of the raised edges and thereby forming a series of undercut projections having both faces curved and which constitutes clenchers.

In testimony whereof we have hereunto set our hands in presence of two subscribing witnesses.

JOSEPH R. MILLER.
ULYSSES S. HUGGINS.

Witnesses:
M. A. DAVIS,
CHAS. P. SWINT.